United States Patent
Rogers et al.

(10) Patent No.: US 6,896,863 B2
(45) Date of Patent: May 24, 2005

(54) SODIUM CYANIDE PROCESS

(75) Inventors: Janet Marie Rogers, Beaumont, TX (US); Daniel Albert Green, Moylan, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 121 days.

(21) Appl. No.: 10/404,321

(22) Filed: Apr. 1, 2003

(65) Prior Publication Data
US 2004/0197256 A1 Oct. 7, 2004

(51) Int. Cl.[7] .................................................. C01C 3/10
(52) U.S. Cl. .......................................................... 423/379
(58) Field of Search .......................................... 423/379

(56) References Cited

U.S. PATENT DOCUMENTS

| | | |
|---|---|---|
| 2,726,139 A | 12/1955 | Oliver |
| 2,993,754 A | 7/1961 | Jenks et al. |
| 3,241,911 A * | 3/1966 | Guerin et al. ................ 423/379 |
| 3,365,270 A | 1/1968 | Guerin |
| 3,653,820 A | 4/1972 | Kobs et al. |
| 4,083,935 A | 4/1978 | Makar |
| 4,267,159 A | 5/1981 | Crits |
| 4,847,062 A | 7/1989 | Rogers et al. |
| 4,902,301 A | 2/1990 | Rogers et al. |
| 6,183,710 B1 | 2/2001 | Rogers et al. |

FOREIGN PATENT DOCUMENTS

DE          1 143 798          2/1963

* cited by examiner

*Primary Examiner*—Wayne A. Langel

(57) ABSTRACT

A process that can be used to produce NaCN is provided. The process comprises contacting hydrogen cyanide with sodium hydroxide solution to produce a NaCN solution and crystallizing the NaCN solution wherein the process is carried out in the presence of an acid or a metal salt of the acid in which the acid has a $pKa \leq 4.4$. The NaCN crystals can be separated from the slurry and dried.

14 Claims, No Drawings

SODIUM CYANIDE PROCESS

FIELD OF THE INVENTION

This invention relates to a process for crystallization of sodium cyanide and a process for sodium cyanide production.

BACKGROUND OF THE INVENTION

Sodium cyanide (NaCN) has a variety of uses. For example, it is used in electroplating, treating metal surfaces, extracting and recovering precious metals from ores, and a number of other chemical applications. The use of NaCN in the leaching of ores that contain precious metals, such as gold and silver, is well known in the art.

To produce NaCN, hydrogen cyanide (HCN) can be neutralized with aqueous sodium hydroxide (NaOH) solution, followed by evaporative crystallization to produce slurry of NaCN crystals, which can be separated from the slurry and dried. During the crystallization of NaCN from the aqueous solution, some liquid can be trapped inside the crystals thereby producing an undesirable NaCN. Also, the aqueous solution can contain certain impurities such as, for example, iron. The impurities decrease the crystal quality. Additionally, HCN can undergo polymerization during the NaCN process to produce HCN polymer, which can, for example, foul equipment and degrade NaCN quality. The NaCN crystals are usually formed by dry compression methods into briquettes.

The briquettes are generally shipped to consumers in containers designed to exclude exposure to atmospheric air for NaCN is very hygroscopic and can absorb substantial quantities of water when exposed to atmospheric air. If exposed to atmospheric air, serious difficulties in shipping and storage can result due to caking. Also, there is the added cost of excluding atmospheric air. Majority of consumers generally convert the NaCN briquettes into an aqueous solution, sometimes after breaking the briquettes into smaller particles, to produce a solution containing about 20 to 25 weight % NaCN. To avoid hydrolysis with the resulting evolution of hazardous hydrogen cyanide vapors, an alkali such as NaOH is added to the dilution water raising the resulting solution pH to about 12 or higher.

To avoid difficulties and cost associated with storage of the anhydrous product and industrial hygiene hazards due to generation of respirable dust when handling anhydrous NaCN briquettes or breaking the briquettes into smaller particles, some consumers have changed to direct solution storage by dissolution of the briquettes in the shipping container, usually tank trucks or railway cars, or in a storage tank, and unloading the resulting solution into storage tanks. Though shipment of NaCN solution is an alternative, it presents high shipping costs and a high environmental risk of spills in the event of an accident during transportation.

Accordingly, developing a process for producing NaCN that eliminates the defects disclosed above would be a great contribution to the art.

SUMMARY OF THE INVENTION

A process that can be used to produce NaCN is provided which comprises contacting HCN with NaOH solution to produce a NaCN solution or slurry and crystallizing the NaCN solution or slurry wherein the process is carried out in the presence of an acid or a metal salt of the acid in which the acid has a pKa$\leq$4.4.

DETAILED DESCRIPTION OF THE INVENTION

The invention comprises a process that can be used to produce NaCN is provided. The process comprises contacting HCN with NaOH solution to produce a NaCN solution or slurry and crystallizing the NaCN solution. The process is carried out in the presence of an acid or a metal salt of the acid in which the acid has a pKa$\leq$4.4. The NaCN crystals can be separated from the slurry and dried.

The acid preferably has a pKa of $\leq$4.8, more preferably $\leq$4.4, and most preferably $\leq$4.2. Generally, the lower end of the pKa is about 1.9. Any acid can be used. The preferred acid is an organic acid. Examples of suitable acids include, but are not limited to, glycolic acid, acetic acid, succinic acid, lactic acid, formic acid, glyceric acid, citric acid, fumaric acid, citraconic acid, maleic acid, sulfamic acid, esters of these acids, and combinations of two or more thereof. The preferred acid is glycolic acid for it is readily available.

Any metal salt of an acid disclosed above can also be used so long as the metal salt can be readily converted to the acid. The metal can be, for example, an alkali metal or alkaline earth metal. The preferred metal salt is sodium glycolate for it is readily available.

The amount of acid or metal salt can be any quantity so long as the amount can substantially improve the NaCN crystal. Generally, the molar ratio of acid to hydrogen cyanide can be in the range of from about 0.001:1 to about 1000:1.

An acid or metal salt thereof can be introduced during the synthesis of HCN, the process of which is well known to one skilled in the art, combined with HCN or NaOH solution, introduced during the contacting of HCN and NaOH, or introduced during the crystallization of NaCN.

The process can generally be carried out at a temperature in the range of from about 25° C. to about 130° C., preferably about 30° C. to about 100° C., under a pressure that can accommodate the temperature range, and for a time sufficient to produce NaCN crystals, generally about 10 seconds to about 2 hours.

The process can also comprise contacting HCN with aqueous NaOH solution comprising a base and a rheology modifier, in the presence of an acid or a metal salt of the acid as disclosed above, to produce an aqueous solution or slurry followed by cooling the solution or slurry to provide a NaCN paste composition. The production of NaCN solution or slurry can also be carried out at the temperature disclosed above.

A paste is defined as a suspension of solid particles in a liquid phase. It can have a viscosity of the suspension generally about 1 to about 500 Pa·s at 25° C. in the shear rate range of about 1 s$^{-1}$ to about 10 s$^{-1}$. The shear viscosity, or simply viscosity, is the proportionality constant between shear stress and shear rate for a material, and is a common measurement, which can be used to characterize the fluidity of the paste compositions of this invention. As described in "An Introduction to Rheology", by H. A. Barnes, J. F. Hutton and K. Walters, Elsevier, 1989, pp. 26–31, viscosity may be measured in any of several types of rotational instruments employing different probe configurations: parallel plate (or disk), cone and plate, or concentric cylinder. Sodium cyanide can be present in the paste composition at least about 45, preferably at least 55, and most preferably 60 weight % and can be in the range of about 45 to about 82, more preferably about 55 to about 80, and most preferably 60 to 75 weight percent (%), based on total weight of the composition.

The process for producing a NaCN paste composition is typically free from sodium cyanide dihydrate ($NaCN \cdot 2H_2O$), even when cooled below the anhydrous $NaCN/NaCN \cdot 2H_2O$ transition temperature. The NaCN in the paste is anhydrous NaCN in the presence of water. Too high a concentration of the dihydrate, which is a rigid solid, would detrimentally affect the rheological properties of the composition. Formation of $NaCN \cdot 2H_2O$ would reduce the amount of free water in the paste composition. The presence or absence of $NaCN \cdot 2H_2O$ can be ascertained by X-ray powder diffraction analysis since anhydrous NaCN has a cubic structure and $NaCN \cdot 2H_2O$ has a monoclinic structure.

When producing a paste composition, the NaOH solution preferably also comprises a base in a quantity such that the base is present in the final paste in the range of from about 2 to about 20%, based on the total weight of the composition. Any organic or inorganic base that can provide a pH of the composition at about 12 or higher can be used, preferably a metal oxide, metal hydroxide, metal hydrosulfide, metal carbonate, metal bicarbonate, hydrated metal oxide, or combinations of two or more thereof in which the metal is a Group IA metal, Group IIA metal, or combinations thereof of the CAS version of the Periodic Table of the Elements, CRC Handbook of Physics and Chemistry, $67^{th}$ edition, 1986–1987, CRC Press, Boca Raton, Fla. Examples of the preferred bases include, but are not limited to, sodium oxide, sodium hydroxide, potassium oxide, potassium hydroxide, lithium hydroxide, cesium hydroxide, beryllium hydroxide, calcium oxide, calcium hydroxide, magnesium oxide, magnesium hydroxide, sodium hydrosulfide, sodium carbonate, sodium bicarbonate, and combinations of two or more thereof. The presently most preferred base is sodium hydroxide for it is readily available and inexpensive. Using NaOH as base facilitates preparation of the NaCN paste composition particularly when the NaCN solution is prepared by absorbing HCN reactor gas into a solution of NaOH, by reducing the number of steps and number of reagents needed. By HCN reactor gas, it is meant the product from a process to produce HCN. HCN reactor gas can be produced by any processes known in the art such as, for example, the Andrussow process, wherein methane, ammonia and air are reacted in the presence of a catalyst, and the BMA process wherein a hydrocarbon and ammonia are reacted in catalyst lined ceramic tubes. Because such processes are well known to one skilled in the art, description of which is omitted herein for the interest of brevity.

If the composition comprises a rheology modifier disclosed herein, a base can be present in the composition in the range of from about 2 to about 15, preferably about 3 to about 12, and most preferably 3 to 7 weight %, based on the total weight of the composition. However, if the composition does not comprise a rheology modifier, the base is preferably present in the composition in the range of about 7 to about 20%.

The paste composition can comprise water (regular tap water, deionized water, distilled water, a solution containing a dissolved base, or combinations of two or more thereof) in any quantity so long as the quantity is sufficient to effect the production of a NaCN composition having a viscosity, as defined and measured by the method disclosed above, of about 1 to about 500, preferably about 3 to about 200 Pa·S at 25° C. in the shear rate range of about $1 \, s^{-1}$ to about $10 \, s^{-1}$. Generally, water is present in the composition at least about 15 weight %.

Any material, which can prevent the sodium cyanide from settling into a "rock-like" solid during dewatering of the composition, can be used as a rheology modifier. The presently preferred rheology modifier is one or more metal carboxylate in which the metal is a Group IA metal, Group IIA metal, as defined above, or combinations of two or more thereof. Examples of suitable rheology modifiers include, but are not limited to, sodium formate, sodium acetate, sodium propionate, sodium lactate, sodium citrate, potassium formate, potassium acetate, potassium tartarate, and combinations of two or more thereof.

The rheology modifier can be present in the composition in the range of from about 0.01 to about 10, preferably 0.3 to about 6%, and most preferably 1 to 4 weight %, based on the total weight of the composition. However, if the base is present in the composition in the range of from about 7 to about 20 weight %, the rheology modifier can be present in the composition up to 1%, and sodium cyanide can be present in the composition in the range of from about 45 to about 78 weight %. Increasing the base concentration decreases the quantity of rheology modifier required.

A paste compositions may contain measurable quantities of impurities, particularly sodium carbonate ($Na_2CO_3$), which is formed by the reaction of carbon dioxide (typically present in the HCN reactor gas) with NaOH neutralizing agent. The level of $Na_2CO_3$ in the final product should not be detrimental to the formation of a stable paste and is typically less than 6 weight %.

Upon cooling, a NaCN paste composition comprising, consisting essentially of, or consisting of the following components, NaCN, a base, an optional rheology modifier, and at least about 15% water is produced. If dilute NaOH or NaOH solution is used, slurry or solution of NaCN may require dewatering or concentrating to produce the desired paste compositions. If needed, dewatering can be carried out before or after the aqueous medium comprising NaCN is cooled. Any of a number of standard processes for concentrating slurries known to those skilled in the art can be used, such as, for example, evaporation, sedimentation and filtration.

According to the invention, the NaCN crystal or paste composition disclosed above can be contacted with an ore causing the metals to be leached from the ores. Generally, treating ores can involve dissolving the NaCN crystal or paste composition in water to form an aqueous solution by any method known to one skilled in the art. Because leaching metals from ores is well known to one skilled in the art, description of which is omitted herein for the interest of brevity. The following examples are provided to further illustrate, but are not to be construed to unduly limit the scope of, the invention.

EXAMPLES

Example 1

Sodium cyanide from solutions of composition typical of commercial sodium cyanide production was used in this example. The production is disclosed in U.S. Pat. No. 4,847,062, disclosure of which is incorporated herein by reference.

Crystallization of NaCN was carried out in a small cell that provided optical access to the solution and crystals that form. The cell is similar to that developed by Garside and Larson (J. Garside, A. Mersmann & J. Nyvlt (eds.) *Measurement of Crystal Growth Rates,* 1990, European Federation of Chemical Engineering, Working Party on Crystallization, P. 83), disclosure of which is incorporated herein by reference for the interest of brevity. The cell consisted of a 15 $cm^3$ solution chamber contained between two glass plates. The top plate was thicker, forming an insulating barrier. The lower plate separated the crystallizing solution from thermostated water circulated through the device from a constant-temperature bath. The water first traveled through a small metal coil that kept the filled Teflon® body of the device at the desired temperature. By controlling the temperature of the circulating water with the bath, good temperature control of the solution was maintained. Crystals were grown on a small glass "plafform" that was just above the bottom plate, resting on several small glass legs. Crystals growing on the plate were then at the average solution temperature and not at the temperature of the lower plate, which may be more or less than the solution temperature when the heating/cooling system is being used to change the cell temperature. The entire cell was placed upon the stage of a microscope for visual observation and photography.

In this example, crystals were formed from a solution prepared by saturating "mother liquor" from an operating commercial sodium cyanide crystallizer with solid sodium cyanide at 80° C. Mother liquor is the solution from which crystals form in an operating crystallizer. It comprised water, sodium cyanide, and a range of impurities typical of those found during commercial crystallizer operation. The solution was saturated by taking mother liquor, adding an excess of NaCN, obtained from Aldrich, and bringing the suspension to 80° C. while stirring. The solution was held with gentle stirring at this temperature for more than 50 minutes to reach equilibrium between the solution of dissolved NaCN and solid NaCN. The preheated cell was filled with this solution that was filtered through a filter with a 0.45 $\mu$m pore size. The cell was then quickly cooled to 5° C. above the desired crystallization temperature using refrigeration of the constant-temperature bath. The temperature decreased approximately another 5° C. after turning off the refrigeration; it was at this temperature that nucleation was initiated and crystal growth begun. Crystal nucleation was initiated by drawing a small mass of sodium cyanide crystals, "parent" crystals, attached to a stainless steel rod across the glass platform. A multitude of very small particles sloughed-off the parent crystals, depositing on the growth platform. These very small particles then served as crystal nuclei. Sliding the parent crystals initiated crystal growth in the cell.

Once crystal growth began, a spot was chosen to follow for crystal growth rate estimation. A field of view with several well-separated crystals was chosen. Their growth rate was estimated by taking still and video images of them as a function of time. The crystal growth rate eventually slowed because the supersaturation was depleted from its initial value as crystals grew in the now isothermal cell. The images of crystal growth were used for only the first few minutes of growth when the cell was at or near the initial supersaturation. Growth rates were reported as face velocities, which were ½ the rate at which the width of the crystal grows. This method gave an estimate of representative crystal growth rates. Differences of 2–3 $\mu$m/min were not important, but differences of 4 $\mu$m/min or more were considered significant.

Crystal morphology was judged by observing and photographing a broader sample of the crystals grown in the cell. After a few minutes spent observing the chosen crystal growth measurement area, the cell was scanned with a microscope and the crystals observed were recorded with both video and still photography.

Three separate crystallizations were performed. In two, sodium cyanide was crystallized from plant mother liquor with no added sodium glycolate. Two crystallization temperatures were used: 50° C. and 60° C. (undercooling of 30 and 20° C. respectively).

In the third, sodium glycolate was added to the solution (final 2 weight %) as it was being prepared. This experiment was performed at about 67° C.

Typical cubic morphology of NaCN was found for the crystals obtained from crystallization in the absence of sodium glycolate. The crystals generally developed more defects than those obtained from the crystallization in the presence of glycolate. These defects are rectangular surface pits. Some elongated crystals, formation of agglomerates, and variation in level of defects from crystal to crystal were also detected.

Average crystal face growth velocities estimated for the crystals grown with no glycolate added and 20° C. undercooling were 8 $\mu$m/min and for 2 wt. % added sodium glycolate and 13° C. undercooling were 8 $\mu$m/min. The results showed that the presence of glycolate did not retard the crystal growth rate.

Example 2

This example shows NaCN crystals grown in the presence of iron, with and without glycolate.

Except for the addition of iron as described below, the same procedure as described in example 1 was followed. The solution was saturated with NaCN at 80° C. In this case, all crystallization was initiated at 60° C. In this example, additional iron was added to the plant mother liquor in the form of ferrio chloride, $FeCl_3$. Final concentration of added iron was 30 ppm (parts per million, based on Fe). After solution preparation, small brown specks settled at the bottom of the container, which appeared to be $FeCl_3$. Therefore, the mother liquor was saturated with iron and 30 ppm additional iron was above the mother liquor's iron saturation concentration.

An experiment was performed with iron and no sodium glycolate and another experiment was performed with the same iron concentration and 2 weight % sodium glycolate added.

Crystal growth rates for both experiments were 6 $\mu$m/min. The presence of sodium glycolate did not slow the crystal growth. These values are lower than those reported for similar conditions in the absence of iron. Additional iron appeared to slow the crystal growth. However, this reduction was probably not significant because the reduction in growth rate was at the expected resolution limit of growth rate measurements.

Crystals grown from mother liquor with 30 ppm additional iron added as $FeCl_3$ had distinctly different crystal quality from those produced in example 1. Large defects centered in the middle of each crystal face were found in essentially all of the crystals in this sample. In some cases these defects have grown over to form liquid-filled inclusions or other traces of their presence during the crystal growth in the center of the crystals. There also appeared significant surface corrugation on the larger crystals.

On the other hand, the crystals obtained from solution containing sodium glycolate had significantly better quality. The depth and severity of the large central defects was greatly reduced. They were still present in several crystals but their depth was significantly reduced, as was the number of associated inclusions. Surface roughness was more apparent, either because of an actual increase in surface roughness or because this surface roughness was merely more noticeable when the large central defects decreased. Otherwise crystal habit and degree of agglomeration were unchanged.

Example 3

In this example, 10 ppm $FeCl_3$ (iron basis) was added along with 2% sodium glycolate. Small brown specks, as in Example 2, were left in the flask after solution preparation. It is likely that this was undissolved $FeCl_3$. We again expect that the actual concentration of iron was determined by the $FeCl_3$ saturation in the mother liquor. Therefore, we expect that the actual concentration of the additional iron was less than 10 ppm in each case and the same value regardless of whether 10 or 30 ppm was added.

The results showed that crystal quality was very similar to that obtained from example 2, with glycolate. The measured crystal growth rate was 4 µm/min, somewhat lower than that found in example 2, but approximately the same within the expected accuracy of the measurement.

What is claimed is:

1. A process comprising contacting HCN with aqueous NaOH to produce a solution comprising NaCN and crystallizing said NaCN to produce slurry of NaCN crystals wherein said process is carried out in the presence of glycolic acid or a metal salt of said acid.

2. A process according to claim 1 wherein the molar ratio of said acid to said hydrogen cyanide is in the range of from about 0.001:1 to about 1000:1.

3. A process according to claim 2 wherein said NaCN crystal is separated from said slurry and is dried to produce a dried NaCN crystal.

4. A process according to claim 1 wherein said process is carried out in the presence of said glycolic acid.

5. A process according to claim 4 wherein said process is carried out in the presence of sodium glycolate.

6. A process according to claim 5 wherein the molar ratio of said sodium glycolate to said hydrogen cyanide is in the range of from about 0.001:1 to about 1000:1.

7. A process according to claim 6 wherein said NaCN crystal is separated from said slurry and is dried to produce a dried NaCN crystal.

8. A process according to claim 3 further comprising dissolving said NaCN crystal with water to produce a solution and contacting an ore with said solution.

9. A process according to claim 7 further comprising dissolving said NaCN crystal with water to produce a solution and contacting an ore with said solution.

10. A process comprising (1) contacting a HCN with aqueous NaOH to produce a solution comprising NaCN and (2) crystallizing said NaCN, in the presence of glycolic acid or a metal salt of said acid, to produce NaCN crystals wherein said metal is an alkali or alkaline earth metal.

11. A process according to claim 10 wherein said process is carried out in the presence of glycolic acid.

12. A process comprising (1) contacting HCN with aqueous NaOH to produce solution of NaCN; (2) crystallizing said NaCN, in the presence of glycolic acid or sodium glycolate, to produce NaCN crystals; (3) separating said crystals from said solution; and (4) drying said crystals.

13. A process according to claim 12 wherein said process is carried out in the presence of glycolic acid.

14. A process according to claim 12 wherein said process is carried out in the presence of sodium glycolate.

* * * * *

UNITED STATES PATENT AND TRADEMARK OFFICE
CERTIFICATE OF CORRECTION

PATENT NO. : 6,896,863 B2
DATED : May 24, 2005
INVENTOR(S) : Janet Marie Rogers and Daniel Albert Green It is certified that error appears in the above-identified patent and that said Letters Patent is hereby corrected as shown below:

<u>Column 7,</u>
Line 30, "the presence of said glycolic" should read -- the presence of said metal salt of said glycolic --.

Signed and Sealed this

Ninth Day of May, 2006

JON W. DUDAS
*Director of the United States Patent and Trademark Office*